No. 808,464. PATENTED DEC. 26, 1905.
K. T. LYNN.
FRUIT CUTTER AND PITTER.
APPLICATION FILED FEB. 23, 1904.
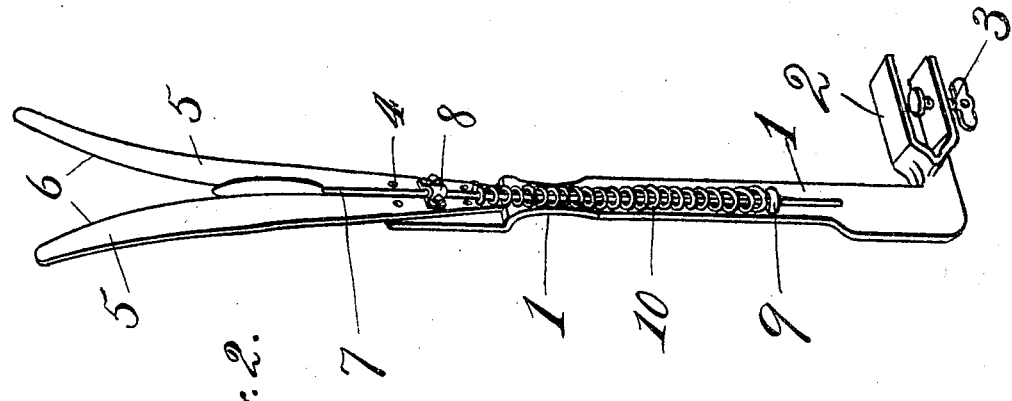
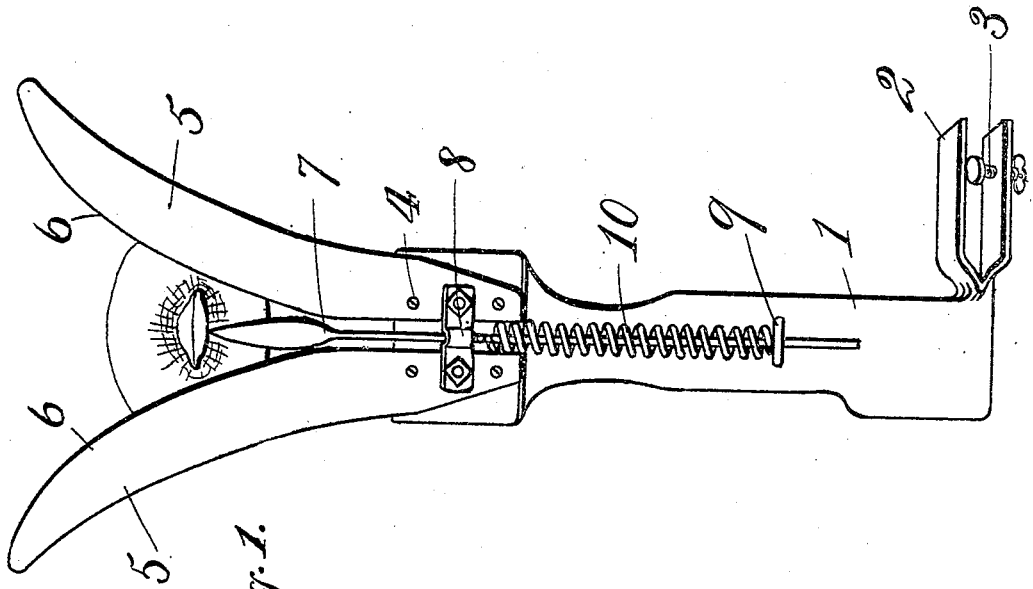
Witnesses
K. Lockwood Nevins.
Bessie Gorfinkel.
Inventor
King T. Lynn
By Francis M. Wright.
Attorney

UNITED STATES PATENT OFFICE.

KING T. LYNN, OF FRESNO, CALIFORNIA, ASSIGNOR OF ONE-HALF TO A. MOCKER, OF SAN FRANCISCO, CALIFORNIA.

FRUIT CUTTER AND PITTER.

No. 808,464.     Specification of Letters Patent.     Patented Dec. 26, 1905.

Application filed February 23, 1904. Serial No. 194,966.

*To all whom it may concern:*

Be it known that I, KING T. LYNN, a citizen of the United States, residing at Fresno, in the county of Fresno and State of California, have invented certain new and useful Improvements in Fruit Cutters and Pitters, of which the following is a specification.

My invention relates to an improved fruit cutter and pitter for cutting fruit, such as peaches and apricots, for the purpose of drying the same or for other purposes.

The object of my invention is to provide a device of this kind which shall be cheap and simple in construction and effective in operation.

In the accompanying drawings, Figure 1 is a side elevation of the device. Fig. 2 is a perspective view thereof.

Referring to the drawings, 1 represents a standard which is adapted to be supported on a table by means of the forked extensions 2 and clamping-screw 3. Upon said standard are secured by screws 4 a pair of blades 5, having sharpened edges 6 to cut the fruit. Said blades are spaced at a slight distance from each other, as shown in Fig. 1, to permit the movement therebetween of a plunger 7, which moves vertically through an upper guide 8, secured to the blades, and a lower guide 9, formed upon the stem. A spring 10 is coiled around the stem of the plunger and is secured at its upper end to the plunger and has its lower end resting on the lower guide 9, whereby said spring is compressed upon the depression of the plunger.

The operation of the device is as follows: The machine having been clamped to the table, the fruit is fed by hand. The peach or apricot is placed between the blades and is pressed down until its pit or stone is caught by the blades 5. Then a slight twist is given to the fruit, which will finish cutting it and will twist the meat of the fruit free from the pit. The fruit now being free from the pit may be deposited upon the table or in a box, as desired. The plunger, which has been depressed by the pit striking the end thereof, now comes up under the action of the spring 10 and pushes the pit from between the blades, so that it falls down into a box out of the way, leaving the device free for another fruit.

The device cuts the peach or apricot smoothly and with a clean cut and does not break or mash the fruit. It enables many times as much fruit to be cut in the same time as with the old method of cutting the fruit by hand. It is at the same time cheap and simple in construction and not liable to get out of order.

I claim—

1. In a device of the character described, the combination of a stem provided with means for supporting the same upon a table, upwardly-extending diverging blades secured to said stem for cutting the fruit, said blades being spaced from each other, as shown and the edges thereof curving outward continuously, a plunger movable vertically between said blades, means for guiding the plunger, and a spring for pressing said plunger upward, substantially as described.

2. In a device of the character described, the combination of the stem provided with means for supporting the same upon a table, the upwardly-extending diverging blades secured to the stem for cutting the fruit, said blades being spaced from each other as shown, the plunger moving vertically in the space between the blades, the guides secured to the stem for the plunger, and a coiled spring around the plunger for normally pressing said plunger upward, substantially as described.

In witness whereof I have hereunto set my hand in the presence of two subscribing witnesses.

KING T. LYNN.

Witnesses:
    E. A. WILLIAMS,
    W. H. COATES.